United States Patent [19]
Miller et al.

[11] Patent Number: 5,942,140
[45] Date of Patent: Aug. 24, 1999

[54] METHOD FOR HEATING THE SURFACE OF AN ANTENNA DISH

[75] Inventors: Charles G. Miller, Branford, Conn.; John A. Rolls, Armonk, N.Y.

[73] Assignee: Thermion Systems International, Stratford, Conn.

[21] Appl. No.: 08/701,607

[22] Filed: Aug. 22, 1996

Related U.S. Application Data

[63] Continuation-in-part of application No. 08/633,965, Apr. 19, 1996.

[51] Int. Cl.$^6$ ..................................................... H05B 1/00
[52] U.S. Cl. ............................ 219/213; 219/528; 219/548
[58] Field of Search ........................... 219/213, 544, 219/528, 543, 548–549, 529; 338/255–257, 262, 292, 308; 404/71, 79; 343/704, 912

[56] References Cited

U.S. PATENT DOCUMENTS

| | | |
|---|---|---|
| 3,657,516 | 4/1972 | Fujihara . |
| 3,859,504 | 1/1975 | Motokawa et al. . |
| 4,039,720 | 8/1977 | Cherenko et al. . |
| 4,110,151 | 8/1978 | Morse . |
| 4,245,149 | 1/1981 | Fairlie . |
| 4,250,397 | 2/1981 | Grey et al. . |
| 4,259,671 | 3/1981 | Levin ........................................ 343/704 |
| 4,282,049 | 8/1981 | Morse . |
| 4,534,886 | 8/1985 | Kraus et al. . |
| 4,536,765 | 8/1985 | Kaminski .................. 343/704 |
| 4,734,231 | 3/1988 | Morita et al. . |
| 4,737,618 | 4/1988 | Barbier et al. . |
| 4,792,815 | 12/1988 | Moisdon ................................. 343/915 |
| 4,866,452 | 9/1989 | Barma et al. ............................ 343/704 |
| 4,942,078 | 7/1990 | Newman et al. . |
| 4,972,197 | 11/1990 | McCauley et al. ...................... 343/704 |
| 5,010,350 | 4/1991 | Lipkin et al. ............................ 343/704 |
| 5,134,423 | 7/1992 | Haupt ....................................... 343/912 |
| 5,250,228 | 10/1993 | Bairgrie et al. . |
| 5,344,696 | 9/1994 | Hastings et al. . |
| 5,353,037 | 10/1994 | Jones ....................................... 343/704 |
| 5,361,183 | 11/1994 | Wiese . |
| 5,528,249 | 6/1996 | Gafford et al. ......................... 343/704 |
| 5,617,107 | 4/1997 | Fleming .................................. 343/704 |

FOREIGN PATENT DOCUMENTS

| | | |
|---|---|---|
| 0053367 | 6/1982 | European Pat. Off. . |
| 0268362 | 5/1988 | European Pat. Off. . |
| 496388 | 7/1992 | European Pat. Off. . |
| 3525488 | 1/1987 | Germany . |
| 3718319 | 12/1988 | Germany . |
| 1-254003 | 10/1989 | Japan . |
| 3-1601 | 1/1991 | Japan . |
| 5-14048 | 1/1993 | Japan . |
| 5-343916 | 12/1993 | Japan . |
| 7-240613 | 9/1995 | Japan . |
| 9-46112 | 2/1997 | Japan . |
| 9515670 | 6/1995 | WIPO . |

*Primary Examiner*—Tu Ba Hoang
*Attorney, Agent, or Firm*—White & Case LLP

[57] ABSTRACT

A method is provided for heating the surface of an antenna dish. In the method, a heater element consisting of a fabric layer composed of conductive fibers is incorporated into a composite that forms the surface of the antenna dish or the entire antenna dish. The heater element is attached to a power source, which energizes the element to heat the surface of the dish.

9 Claims, 9 Drawing Sheets

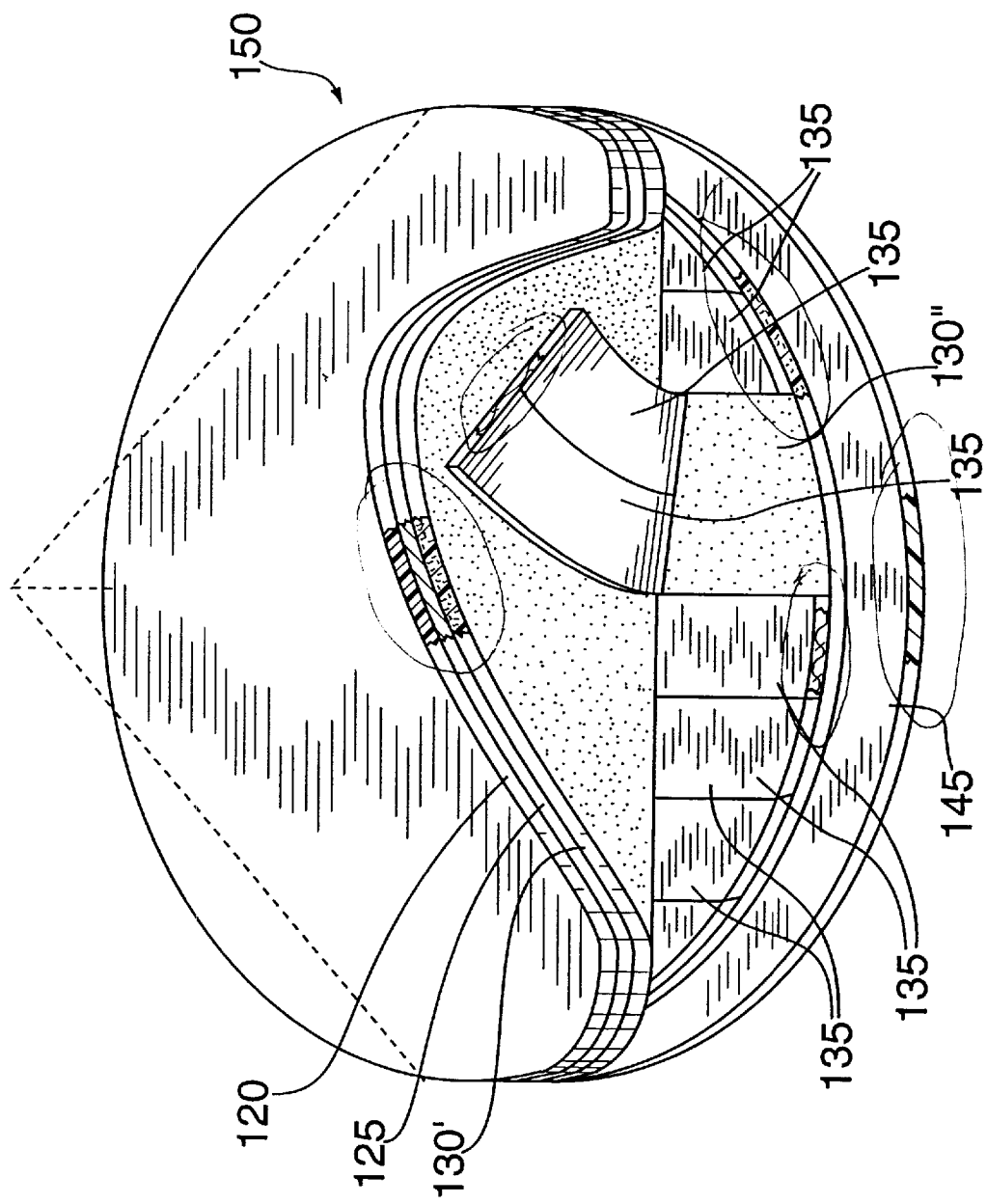

METHOD FOR HEATING THE SURFACE OF AN ANTENNA DISH

CROSS REFERENCE TO RELATED APPLICATION

This application is a continuation-in-part of application Ser. No. 08/633,965, filed on Apr. 19, 1996.

BACKGROUND OF THE INVENTION

1. Field of the Invention

The present invention generally relates to methods of heating the surface of various materials, including floors, walls, roofs, countertops, and antenna dishes. Specifically, the invention relates to methods of heating the surface of a material by applying a heater element, such as a laminated composite heater element, to the particular surface and energizing the heater element.

2. Description of the Prior Art

A variety of heater elements exist in the prior art. U.S. Pat. No. 4,534,886, to Kraus et al., discloses an electrically conductive web composed of a non-woven sheet of conductive fibers and non-conductive fibers. The sheet is saturated with a dispersion containing conductive particles and is then dried. The Kraus et al. heater element is used primarily in heating pads.

International Application No. PCT/US94/13504 (Publication No. WO95/15670) discloses an electrically conductive composite heating assembly. The assembly has an electrically conductive non-woven fiber layer laminated between layers of fiberglass and other dielectric material. The assembly further has an abrasion resistant outer layer. The heater element is used on aerospace structures as an ice protection system to withstand the repeated mechanical stress and thermal cycles encountered in extremely harsh aerospace environments.

U.S. Pat. No. 5,344,696 to Hastings et al. discloses an integrally bonded laminate that is used to thermally control a surface of an aircraft to which the laminate is bonded.

None of the prior art heater elements, however, have been successfully applied to heat the surface of a floor, wall, roof, countertop, or an antenna dish.

SUMMARY OF THE INVENTION

The present invention comprises a method for heating the surface of a solid material, such as a floor, wall, roof, countertop, or an antenna dish. The method comprises providing a heater element, disposing the heater element at a predetermined depth in the material, and energizing the heater element at prescribed intervals and temperatures, effective to heat the surface of the material.

BRIEF DESCRIPTION OF THE DRAWINGS

FIG. 9 is a perspective partial cut-away view of the antenna dish of the invention shown in FIGS. 7 and 8.

DETAILED DESCRIPTION OF THE PREFERRED EMBODIMENT

Figure 1:
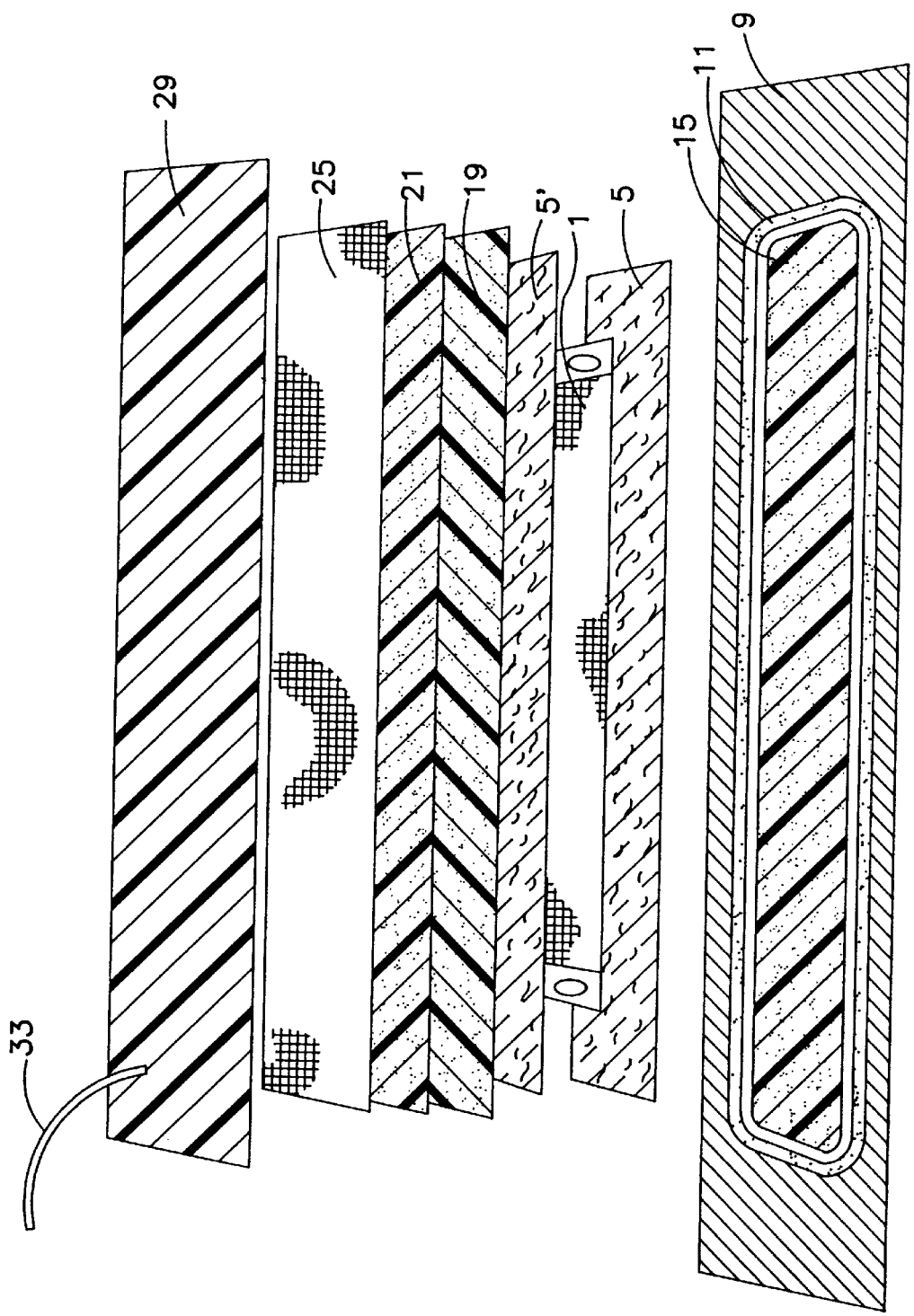
FIG. 1 depicts the construction of a composite heater element of the invention in a mold.

The present invention comprises a method for heating the surface of a material, such as a floor, wall, roof, countertop, or antenna dish. The method comprises providing a heater element, disposing the heater element at a predetermined depth and location in the material and energizing the element at prescribed intervals and temperatures that are effective to heat the surface of the material.

The heater element of the present invention is a laminated composite, impermeable to water, and is of the type disclosed in U.S. Pat. No. 5,344,696 (Hastings et al.), which is incorporated herein by reference. As disclosed in the Hastings et al. patent, the heater element comprises a durable outer ply that is resistant to abrasion and impermeable to water. The outer ply is bonded to and through a conductive layer of fibers and an integrally enveloping adhesive, which is adhered to the surface of a vessel. The conductive layer is connected to a source of electrical energy, and control means are adapted to control the temperature of the surface of the vessel. This laminated structure is considered preferable; however, it is contemplated that other structures may be used. For example, the heater element need not be a laminated structure. Rather, the heater element may comprise merely a layer of conductive fibers. This structure of the heater element is particularly useful if the material into which the heater element is embedded has dielectric properties that protect persons and property from electrical shock while evenly distributing the heat generated by the element.

The preferred heater element is available under the trademark THERMION which is manufactured by Aerospace Safety Technologies, Inc. THERMION is light, flexible and may be translucent. This particular heater element is composed of a hybrid, nickel-coated, carbon fiber processed by current textile art into a thin, conductive, non-woven fabric. The material is a laminate that provides even heating and can be conformed to surfaces having a variety of different contours and shapes. Operational power can be derived from low or high voltage AC or DC power supplies.

As discussed above, the heater element may comprise a layer of conductive fibers that are directly embedded into the material. However, in this instance, the material must possess sufficient dielectric properties to protect persons and property from electrical shock and to distribute the heat generated by the fibers evenly to the surface of the material. Thermoplastic materials typically possess these properties.

The heater element is disposed at a predetermined location and depth in the material. The depth and location may vary according to the particular material and type of heating required.

1. Residential/Commercial Building Use

The thin, unobtrusive nature of the heater element makes it suitable for use in ceramic and marble tile, solid surface materials, Formica, linoleum, and any other floor, wall, roof, or counter covering available. The essential steps of the method of the present invention can be performed in several different ways.

A first variation in the method involves installing in the surface a pre-made panel, usually configured on a mold table for easy transfer to the final surface. As shown in FIG. 1, the pre-made panel comprises a fiberglass resin encapsulated heater element 1, further encapsulated in two fiberglass/resin cloths 5 and 5'. The pre-made panel also contains electrical leads (not shown) attached to the heater element. The electrical leads extend outside of the panel and are attached to an electrical power supply. The laminate optionally can be constructed with multiple layers of the fiberglass resin encapsulated heater element 1. The multiple-layered heater element can provide greater control over the heat output from the assembly.

FIG. 1 shows how a single layer pre-made panel is formed on a transfer table. The fiberglass resin encapsulated heater element 1 is placed on top of a mold table surface 9. A mold release wax 15 is disposed between the encapsulated heater element 1 and the table surface 9. A peel ply 19 is placed above the encapsulated heater element 1. A release ply 21 is disposed above the peel ply 19 and a bleeder cloth 25 is disposed over the release ply 21. Finally, a vacuum bag 29 is disposed over the release ply 21. A seal tape 11 surrounding the layers on the mold is attached to the table top surface 9, and can adhere to the vacuum bag 29 to create a tight seal. A vacuum supply 33 is used to evacuate the air between the layered material in order to bring the layers into close contact with each other and cure the resin, bonding the layers to create the laminate.

Figure 2:
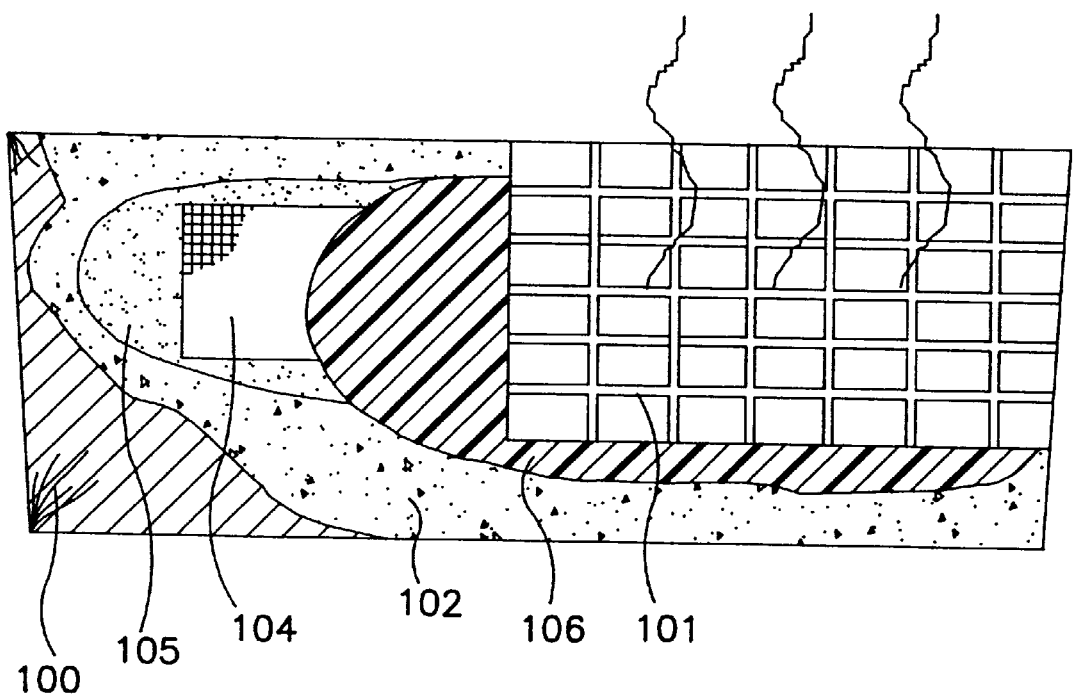
FIG. 2 depicts a typical tile/paver floor containing the heater element as described in the present invention.

Referring to FIG. 2, a pre-formed panel may be installed below a variety of covering surfaces, such as ceramic, marble, or similar paver tiles. In a tile and grout environment 101, the sub-base, whether it is a floor or countertop, may first be covered by a particle board underlayment 100. Some builders choose not to use an underlayment, but its purpose is to aid in leveling the floor and build uniformity. A vapor barrier and one or more concrete base products are then applied over the underlayment set. At a minimum, the concrete 102 should be at least ½ inch thick for standard wet/dry environments, such as kitchen and bathroom floors and counters (see FIGS. 2 and 3). For standing water conditions, such as showers and exterior areas, the layer must be at least twice this thickness. Concrete serves a dual purpose. It limits the surface flexing and also acts as a water barrier. The vapor barrier further prevents water from passing to the wood below either by sweating or cracking of the concrete. A heater element 104 is disposed above the concrete base 102. The heater element 104 optionally contains a syntactic film layer 106 on the back/bottom side for bonding the element 104 to the concrete base 102. Film layer 106 replaces the mastic that would otherwise be required to set heater element 104 in place. Without a bonding film layer, the installer would smear the concrete base with a thin layer of mastic, alternatively referred to as 105, apply the heater element from edge to edge, minimizing air pockets, and roll the element flat against the concrete base 102. Once the heater element 104 is set, the normal process of installing tiles 101 can continue. If necessary, the panel may be punched with suitable tools to create holes or other shapes, as needed, and edge finished to protect against electrical shock. The holes, depending on their relative size and location, will have minimal to moderate effect on the heat output of the device.

Figure 3:
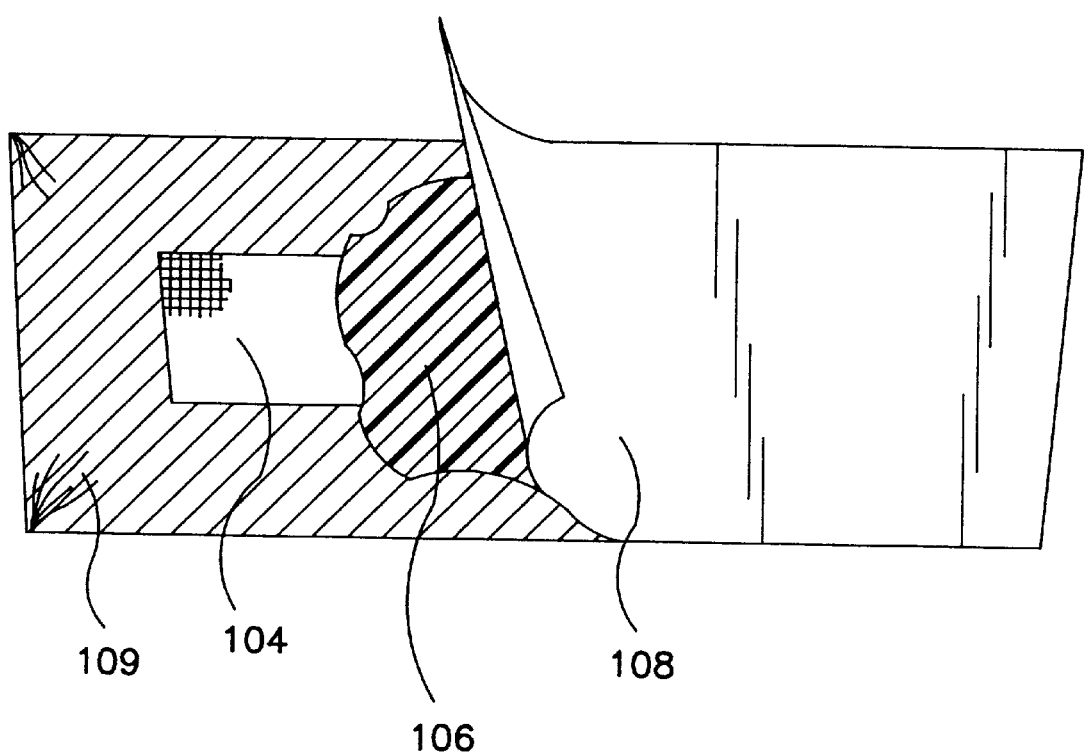
FIG. 3 depicts a FORMICA counter top containing the heater element as described in the present invention.

As depicted in FIG. 3, the heater element 104 can be installed under a countertop layer 108, such as a FORMICA or linoleum top layer, in a manner similar to tile, although the concrete base and vapor barrier are no longer required. In addition, FORMICA/linoleum installation generally utilizes contact adhesives which require additional processing known to those skilled in the art.

A second variation in the method of the present invention involves simultaneously constructing the composite heater element 104 at the time the floor, wall, roof, or countertop material is constructed. For instance, the composite in FIG. 3 may be constructed on the sub-surface 109 simultaneously as the other layers of material are applied over the heater element 104. This second method is particularly useful in the construction of formica and metal countertops. This method is advantageous in that custom-shaped heater elements may be easily incorporated below the finished surface of the material. For example, in the case of wood/concrete substrates, custom-shaped heater elements may be bonded under the finished surface of the material. In carrying out this method, the heater element is disposed on a solid, clean surface, and epoxy resin is applied to bond the element to the material. The composite may also be vacuum cured and heated, if desired. The vacuum process regulates the heater resin content in conjunction with the fiberglass selected. After the curing process is complete, the top surface of the material may be finished, as desired. In the case of FORMICA, a contact adhesive is applied between the element and the top surface before they are joined. Thereafter, the composite is rolled to complete the process.

Figure 4:
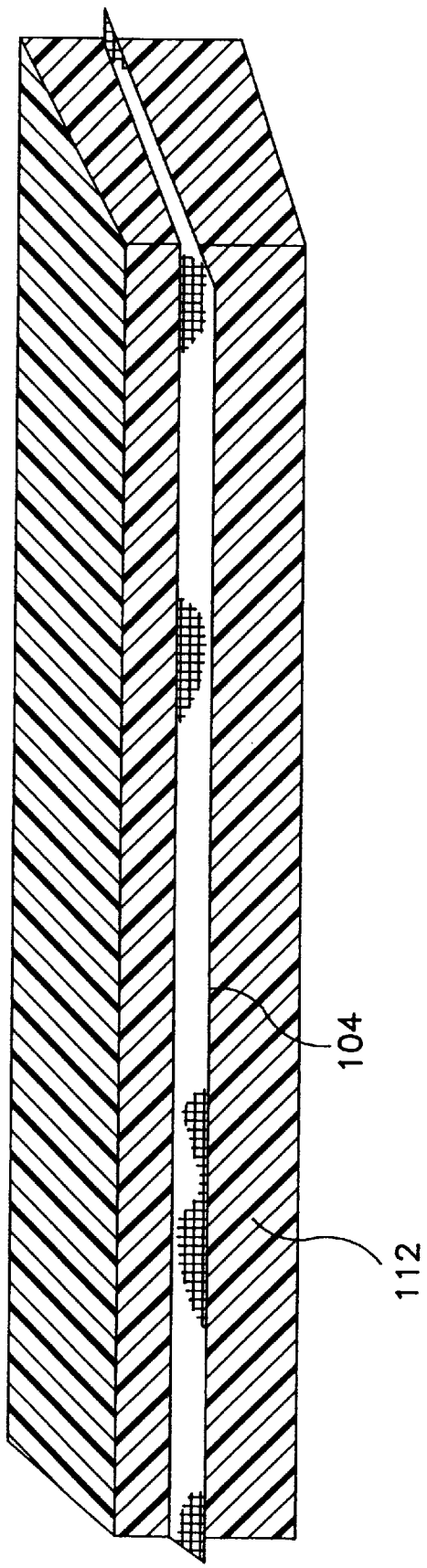
FIG. 4 depicts a typical heater element of the present invention embedded within a solid surface material.

As depicted in FIG. 4, a third variation in the method of the present invention involves providing a heater element 104 without the fiberglass outer layers or resin and encapsulating the element 104 within the finished material at the factory/production level. Such an installation is suitable for solid surface 112 materials such as CORION or any other thermoplastic formed item that has sufficient dielectric strength to isolate the electric heater element from the surface, and that allows cohesive bonding through the heating element. Most structures developed by liquid process molding are excellent candidates. The placement of the heater element 104 can be accurately controlled providing heat as near to the surface as is practical and safe. Using standard counter depths, the heaters can be pre-formed to run front to back allowing the surface to be cut to length, and end finished. A front to back orientation refers to the direction of current flow.

Different configurations of heater placement and orientation may be accomplished at the time of production, allowing for custom needs. Some circumstances may require surface heating in localized areas, for instance, the areas around a sink or other fixtures. The heater element may, therefore, be precut to any particular pattern and may contain holes or cuts, as is necessary. For a field modification to a solid surface application, the surface could be cored within certain dimensions and edge finished, having minimal to moderate effect on the heater's performance.

Figure 5:
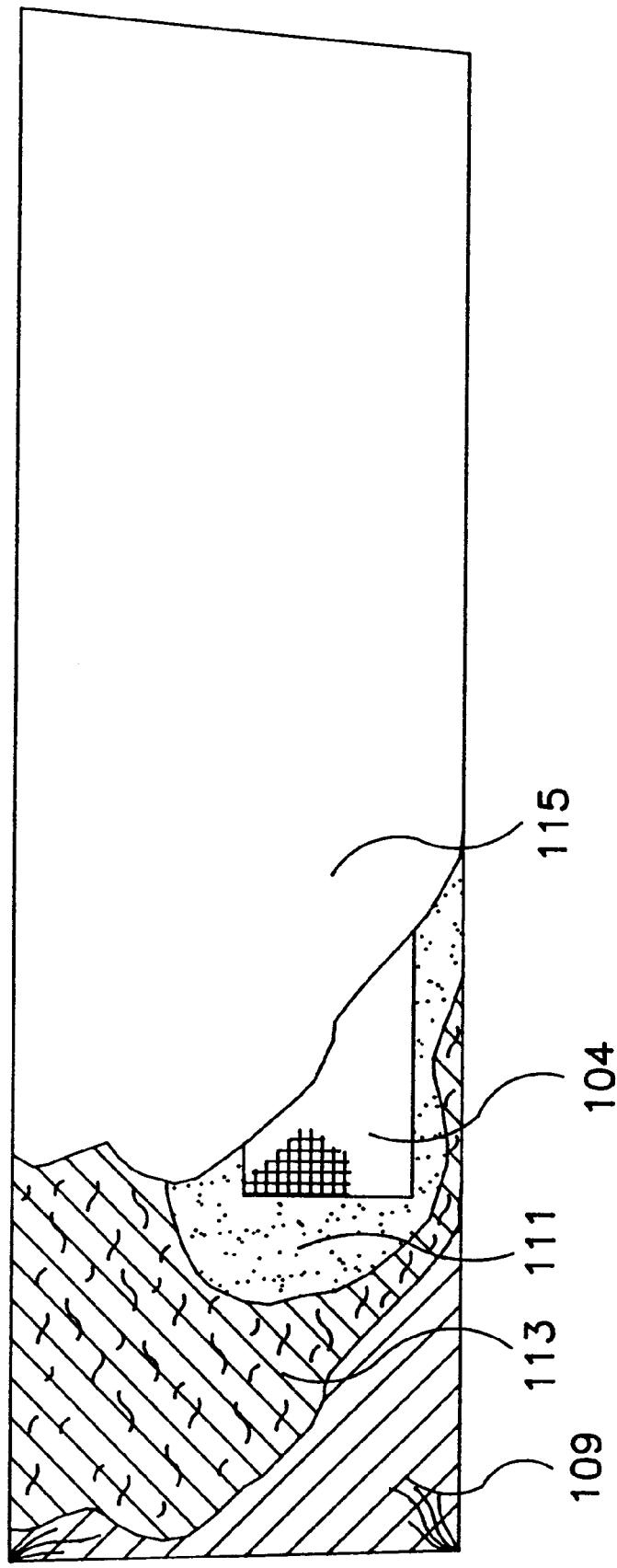
FIG. 5 depicts a heater of the present invention for a roof dam.
Figure 6:
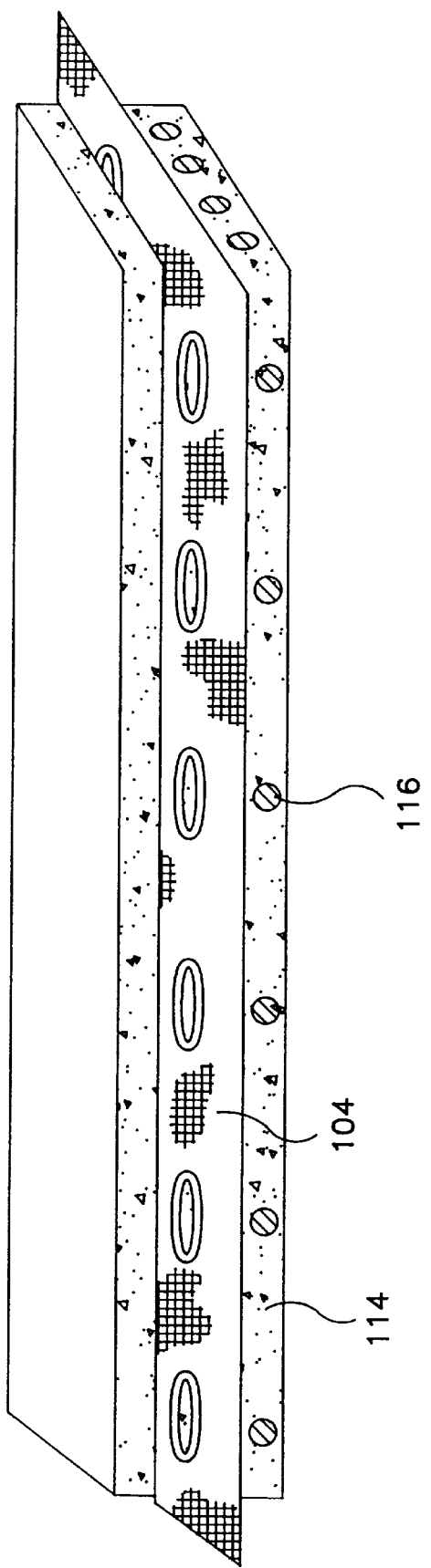
FIG. 6 depicts a typical inlaid concrete walkway containing a heater element as described in the present invention.

Additional residential/commercial building applications include roof deicing as shown in FIG. 5 and concrete walkways as shown in FIG. 6. These applications could use the pre-made panels for convenience and quick installation. Such roof applications are suitable for neoprene, hot mopped, shingled or even metal style roofs. FIG. 5 shows a typical application of the heater element 104 to a roof. Listed from bottom layer to top layer, the typical roof heater comprises a wood sheeting substrate 109, felt paper 113, heater mastic 111, the heater element 104, and the finished roof layer 115. The finished roof layer 115 may be constructed of typical roof finish materials, such as neoprene rubber, metal, or the like.

Application of the heater element in a concrete walkway is depicted in FIG. 6. The walkway contains a perforated panel 114, laid during construction over and above, or in place of, a remesh/rebar 116. The heater element 104 is perforated to allow cohesive bonding of the aggregated concrete 114 through the panel. Finally, a top layer of concrete is disposed above the element.

The heater element may also be applied to rain gutters. Such application may be completed by use of any of the methods discussed. The particular method chosen depends on the installation and gutter product selected.

The heater element may be applied to mirrors. Mirror application to prevent fogging is an example of a simple back side bonding. The heater may be a pre-formed panel or a formed-in-place installation. For radiant heat applications the methods are no different only the object selected to encase the material vary. Besides the possibility of heated pavers, diffused panels for a green house can incorporate the heated panels. The panels can be of simple or complex design and may provide winter environmental control and snow removal. Additional greenhouse installations could provide local heating as well for particular applications, such as lighting pairs for ice/snow protection and for heating/environmental control.

In another embodiment, the invention concerns a method for heating the surface of an antenna dish to prevent and control the formation of ice on the surface of the dish. In this embodiment, a heater element is incorporated into a composite that forms the surface of the antenna dish or the entire antenna dish. The heater element is composed of a layer of conductive fibers, preferably metal-coated fibers.

Figure 7:
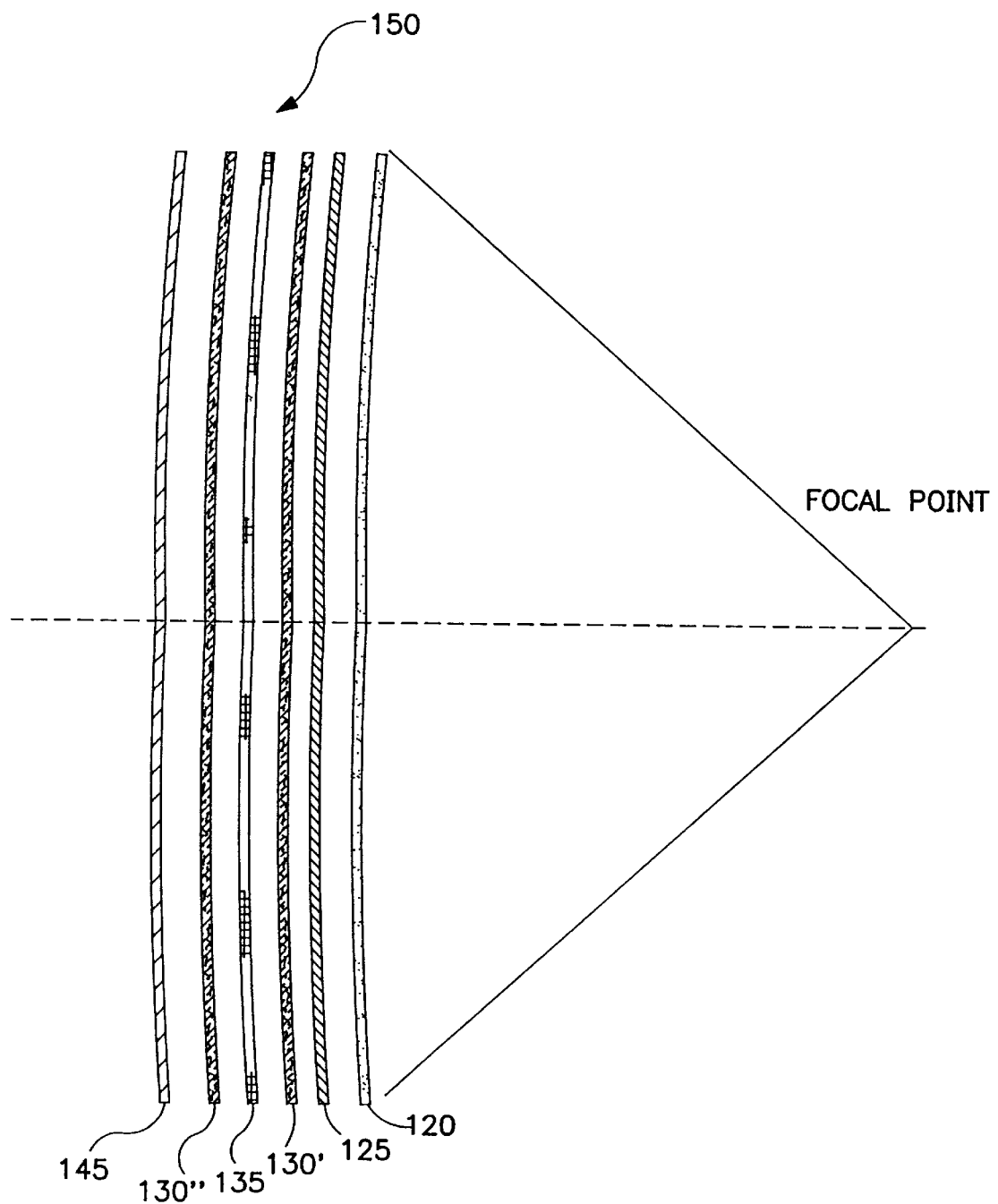
FIG. 7 depicts a cross section of an antenna dish showing the heater element of the invention.

As seen in FIGS. 7 and 9, the composite 150 is constructed by a process in which various materials, including the heater element, are layered over one another. In this process, the layers of the composite are cast in reverse order; the first layer cast in the process serves as the exterior surface of the final product. Specifically, in this process, a gel coat layer 120 is cast or sprayed upon a support carrier or mold (not shown). In the final antenna dish, the support carrier is removed and the gel coat 120 serves as the exterior finished surface of the antenna dish. The gel coat 120 protects the inner layers of the composite from the environment and also provides the surface of the dish with the necessary texture that enables the dish to function properly.

After the gel coat 120 is cast on the support carrier, a reflective fabric screen 125 is then disposed over the gel coat 120. The reflective screen 125 may serve as the transmitter or receiver of the antenna. A first layer 130' of resin and fiberglass "chop" (which consists of small strands of fiberglass) is then disposed over the reflective cloth 125 and allowed to set.

A heater element 135 is then disposed over the first fiberglass-resin layer 130'. The heater element 135 can be made of fabrics, such as THERMION, a man-made metal-coated fiber. Other fibers, such as natural metal-coated fibers, non-coated conductive fibers, metal-coated non-conductive fibers, and metal-coated conductive fibers are all possible candidates with suitable properties for most composite constructions. When used in an antenna dish, the conductive fiber material should possess certain characteristics so that the heater element can efficiently heat the surface of the dish. For example, the conductive fiber material should be light weight, produce even heating, have a minimal thickness, and possess low thermal inertia. A conductive fiber material having low thermal inertia heats up and cools down quickly when the power is turned on and off, respectively. This quickness in heating and cooling facilitates greater control over the distribution of heat generated by the element. In a preferred embodiment, the conductive fiber material is approximately 0.022 ounces per square foot in weight and has a thickness of approximately 0.004 inch.

A second layer 130'' of resin and fiberglass chop is disposed over the heater element 135 and is allowed to set. Finally, a backing substructure 145 is disposed over the second fiberglass resin layer 130''. The substructure 145 may be constructed of balsa wood or other like materials.

The fiberglass resin layers 130' and 130'' provide structural support to the antenna dish and also electrically insulate the heater element 135 from the reflective fabric screen 125 so that they do not electrically interfere with each other or create a short circuit.

Figure 8:
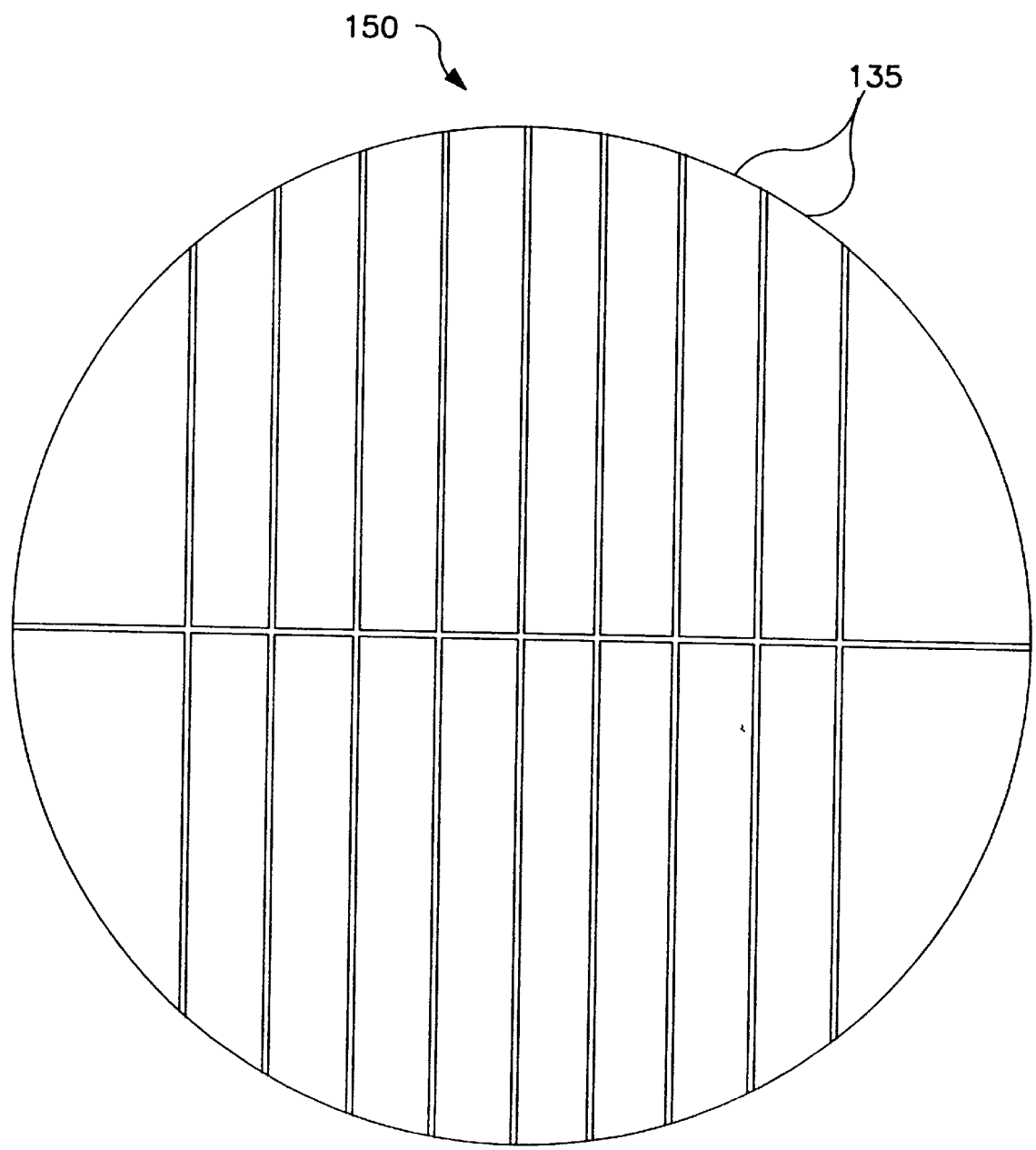
FIG. 8 depicts a front view of an antenna dish containing several heater elements of the invention.

For designs incorporating THERMION as the conductive fiber layer 135, one or two layers of resin and fiberglass chop should be positioned between the THERMION heater element 135 and the reflective cloth 125, depending on the conductive properties of the reflective cloth and the dielectric properties of the resin and fiberglass chop layer(s) 130'. In either case, the THERMION heater element is incorporated into the laminate and separated by the fiberglass resin layers 130' and 130'' from the dish surface and from other conductive materials in the composite to prevent electric shock and short circuiting. Layers of fiberglass, or other fabrics having electrically-insulating properties are suitable dielectrics once encased in resin. Heaters can be configured in several different arrangements. Vertical panels, such as those shown in FIG. 8, are preferable. In FIG. 8, vertical panels 135 are disposed over approximately 75% of the surface area of the dish. The amount of the surface area covered by the vertical panels may be varied depending on the particular application. The heater elements embedded within vertical panels 135 can efficiently heat the entire surface of the dish.

The heater element 135 is connected by wire and/or conductive ribbon to a suitable electric source (not shown), which provides the electrical power to heat the surface of the antenna dish. The power may be controlled by a simple on/off switch or by a more complex temperature/power controller that measures and monitors a number of parameters, including the atmospheric conditions in the vicinity of the antenna dish and the surface temperature of the dish. The controller also adjusts the power delivered to the heater element 135 to control the heat generated by the element in response to the surface temperature of the dish and the existing climate. Controllers that accomplish these tasks are known by those skilled in the art.

Power requirements depend on the amount of heat needed, the size of the dish, and the available power supply. Wires and cables meet at a central controller housing near the dish and provide the necessary timing and temperature response signals to the source of electrical power.

What is claimed is:

1. A method for heating the surface of an antenna dish, comprising:

providing a pre-formed panel heater element to the reflective surface of the antenna dish; wherein said pre-formed panel heater element comprises an inner layer composed of a fabric layer of electrically conductive fibers encapsulated between two fiberglass/resin layers; two outer fiberglass/resin layers disposed on opposing surfaces of said inner layer and encapsulating said inner layer; and electrical leads connected to said conductive fibers and adapted to receive power from a power source;

disposing the pre-formed panel heater element at a predetermined location and depth from the front surface of the antenna dish; and energizing the conductive fibers of the fabric layer to distribute heat evenly on the surface of the antenna dish.

2. The method of claim 1, wherein the fabric layer has a thickness of about 0.004 inch.

3. The method of claim 1, wherein the conductive fibers are metal-coated fibers.

4. The method of claim 1, further comprising disposing the pre-formed panel heater element behind the reflective material on the surface of the antenna.

5. The method of claim 4, further comprising positioning at least one layer of a dielectric material between the pre-formed panel heater element and the reflective material.

6. The method of claim 1, further comprising arranging the pre-formed panel heater element as vertical panels on the antenna dish.

7. The method of claim 1, wherein the fabric layer weighs about 0.022 ounces per square foot.

8. The method of claim 3, wherein the conductive fibers are nickel-coated carbon fibers.

9. The method of claim 6, wherein the vertical panels are disposed over approximately 75% of the surface area of the dish.

\* \* \* \* \*